(12) United States Patent
Sedillo (10) Patent No.: US 8,454,716 B2
(45) Date of Patent: Jun. 4, 2013

(54) VARIABLE FLOW PARTICLE SEPARATING STRUCTURE

(75) Inventor: Patrick M. Sedillo, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 173 days.

(21) Appl. No.: 13/050,072

(22) Filed: Mar. 17, 2011

(65) Prior Publication Data

US 2012/0233973 A1    Sep. 20, 2012

(51) Int. Cl.
*B01D 45/12*    (2006.01)

(52) U.S. Cl.
USPC ............... 55/345; 55/309; 55/394; 55/396; 55/434.2; 55/457; 55/342.2; 55/447; 55/467; 55/470; 55/473; 55/471; 55/472

(58) Field of Classification Search
USPC .............. 55/309, 394, 396, 434.2, 457, 345, 55/342.2, 447, 467, 470–473
See application file for complete search history.

(56) References Cited

U.S. PATENT DOCUMENTS

| | | | |
|---|---|---|---|
| 3,993,463 A | 11/1976 | Barr | |
| 4,685,942 A | 8/1987 | Klassen et al. | |
| 4,928,480 A | 5/1990 | Oliver et al. | |
| 5,498,273 A | 3/1996 | Mann | |
| 5,857,833 A | 1/1999 | Dev | |
| 5,885,333 A * | 3/1999 | Dix | ................................. 96/190 |
| 6,134,874 A | 10/2000 | Stoten | |
| 6,499,285 B1 | 12/2002 | Snyder | |
| 6,698,180 B2 | 3/2004 | Snyder | |
| 6,969,237 B2 | 11/2005 | Hudson | |
| 7,374,593 B2 | 5/2008 | Snyder | |
| 8,007,565 B2 * | 8/2011 | Moredock | ........................... 95/1 |

* cited by examiner

*Primary Examiner* — Jason M Greene
*Assistant Examiner* — Dung H Bui (57) ABSTRACT

A particle separating structure for use with a turbine engine. The particle separating structure includes a main housing, first swirling structure, and second swirling structure. The first swirling structure is provided for swirling cooling fluid passing through a first cooling fluid flowpath defined in the main housing. The second swirling structure is provided for swirling cooling fluid passing through a second cooling fluid flowpath defined in the main housing. The first swirling structure is positionable in at least two positions, a first position allowing cooling fluid to pass through the first cooling fluid flowpath and a second position allowing cooling fluid to pass through the first and second cooling fluid flowpaths. The swirling of the cooling fluid causes particles in the cooling fluid to pass to a particle discharge zone while the cooling fluid passes out of the main housing through a cooling fluid outlet.

15 Claims, 6 Drawing Sheets

FIG. 3C ns that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

VARIABLE FLOW PARTICLE SEPARATING STRUCTURE

FIELD OF THE INVENTION

The present invention relates to a particle separating structure, and more particularly, to a particle separating structure for use with turbine engines, wherein the particle separating structure is capable of accommodating variable volumetric flow rates of cooling fluid therethrough.

BACKGROUND OF THE INVENTION

In gas turbine engines, compressed air discharged from a compressor section and fuel introduced from a source of fuel are mixed together and burned in a combustion section, creating combustion products defining hot working gases. The working gases are directed through a hot gas path in a turbine section, where they expand to provide rotation of a turbine rotor. The turbine rotor may be linked to an electric generator, wherein the rotation of the turbine rotor can be used to produce electricity in the generator.

In view of high pressure ratios and high engine firing temperatures implemented in modern engines, certain components, such as rotating blade structures within the turbine section, must be cooled with cooling fluid, such as compressor discharge air, which may be cooled in an external cooler, to prevent overheating of the components. It is desirable that the cooling fluid provided to the components be substantially particle free, as particles in the cooling fluid can clog cooling fluid passageways in the components, which is undesirable.

SUMMARY OF THE INVENTION

In accordance with a first aspect of the present invention, a particle separating structure is provided for use with a turbine engine. The particle separating structure comprises a main housing, first swirling structure, and second swirling structure. The main housing includes an inlet, a cooling fluid outlet, and a particle discharge zone. The first swirling structure is provided for swirling cooling fluid passing through a first cooling fluid flowpath defined in the main housing. The second swirling structure is provided for swirling cooling fluid passing through a second cooling fluid flowpath defined in the main housing. The first swirling structure is positionable in at least two positions. A first position allows cooling fluid to pass through the first cooling fluid flowpath and a second position allows cooling fluid to pass through the first and second cooling fluid flowpaths. The swirling of the cooling fluid effected by the first and second swirling structures causes particles in the cooling fluid to pass to the particle discharge zone while the cooling fluid passes out of the main housing through the cooling fluid outlet.

In accordance with a second aspect of the present invention, a particle separating structure is provided for use with a turbine engine. The particle separating structure comprises a main housing and first swirling structure. The main housing comprises an inlet, a cooling fluid outlet, a particle discharge zone located radially outwardly from the cooling fluid outlet, a first stop structure, and a biasing member. The first swirling structure is provided in the main housing for swirling cooling fluid passing through a first cooling fluid flowpath defined in the main housing. The first swirling structure is positionable in at least two positions, the positions based on an amount of cooling fluid entering the main housing through the inlet. A first position of the first swirling structure allows cooling fluid to pass through the first cooling fluid flowpath and a second position of the first swirling structure allows a first portion of cooling fluid to pass through the first cooling fluid flowpath and a second portion of cooling fluid to bypass at least a section of the first cooling fluid flowpath. The biasing member biases the first swirling structure toward the first stop structure such that the first swirling structure engages the first stop structure when in its first position. The swirling of the cooling fluid effected by the first swirling structure causes particles in the cooling fluid to pass to the particle discharge zone while the cooling fluid passes out of the main housing through the cooling fluid outlet.

In accordance with a third aspect of the present invention, a cooling fluid distribution structure is provided for use with a turbine engine. The cooling fluid distribution structure comprises a main housing and cooling fluid structure. The main housing comprises an inlet and a cooling fluid outlet. The cooling fluid structure is located in the main housing for distributing cooling fluid passing through the main housing. The cooling fluid structure is positionable in at least a first position and a second position. In the first position, the cooling fluid structure allows cooling fluid to pass through a first cooling fluid flowpath defined in the main housing. In the second position, the cooling fluid structure allows a first portion of cooling fluid to pass through the first cooling fluid flowpath and a second portion of cooling fluid to bypass at least a section of the first cooling fluid flowpath. The cooling fluid structure allows a greater amount of cooling fluid to pass through the main housing when in its second position than when in its first position.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
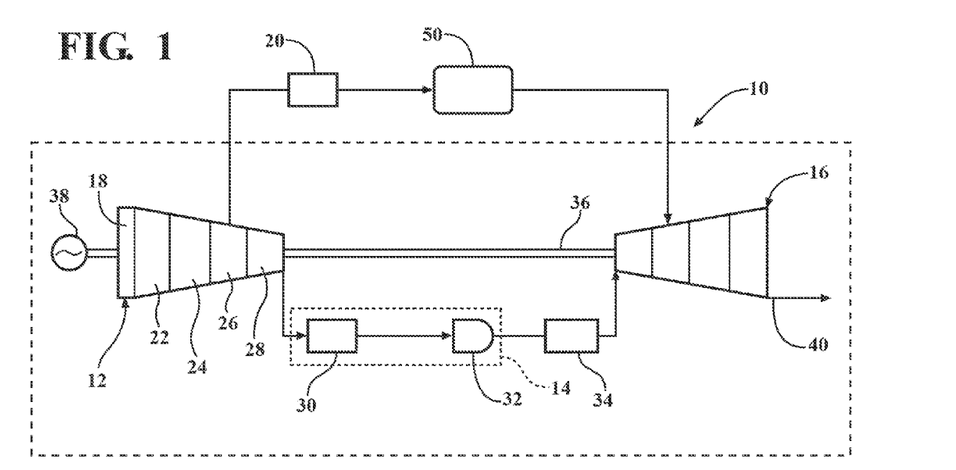
FIG. 1 is a schematic diagram of a gas turbine engine associated with a particle separating structure according to an embodiment of the invention.

Referring to FIG. 1, a gas turbine engine 10 is schematically shown. The engine 10 includes a compressor section 12, a combustion section 14, and a turbine section 16. Inlet air is permitted to enter the compressor section 12 through one or more inlet guided vanes (IGVs) 18, which can be opened and closed or otherwise adjusted to control the mass flow of air into the compressor section 12. It should be understood that the compressor section 12 of the engine 10 can have other assemblies that provide for flow control, including, for example, variable stator vanes. The inlet air is pressurized in the compressor section 12, wherein the majority of the inlet air is directed to the combustion section 14. A portion of the compressed air is delivered to an external cooler 20, as will be described herein. As is known in the art, the compressor section 12 can have one or more stages, such as front stages 22, forward stages 24, middle stages 26, and rear stages 28, as schematically illustrated in FIG. 1.

The combustion section 14 of the illustrated engine 10 includes a combustor shell 30 for receiving compressed air from the compressor section 12, also known as combustor shell air, and one or more combustor apparatuses 32 for receiving and mixing fuel with the combustor shell air and igniting the air/fuel mixture(s) to produce hot working gases, also known as combustion gas.

The combustion gas flows out of the combustion section 14 to the turbine section 16 via a transition section 34 comprising respective transition ducts (not shown) associated with the combustor apparatuses 32. The combustion gas is expanded in the turbine section 16 to provide rotation of a turbine rotor 36, as is known in the art. The rotation of the turbine rotor 36 may be used to power an electric generator 38 coupled to the turbine rotor 36, as schematically illustrated in FIG. 1. The combustion gas is then exhausted from the engine 10 via a turbine exhaust 40.

As noted above, a portion of the compressed air from the compressor section 12 is provided to the external cooler 20. This portion of compressed air is cooled in the external cooler 20 to a desired temperature, such as, for example, between about 250 and about 350 degrees Fahrenheit (° F.) or higher. After exiting the external cooler 20, the cooled and compressed air enters a particle separating structure 50 according to an aspect of the invention, which particle separating structure 50 will be discussed in detail herein. As used herein, the term "particle" refers to solid particles, such as dust, dirt, rust flakes, etc., and/or liquid particles, such as water droplets, etc. The air from the particle separating structure 50 is provided back into the engine 10, e.g., into the turbine section 16 thereof in the illustrated embodiment, for providing cooling for structure to be cooled within the engine 10, such as, for example, rotating blades (not shown) and/or stationary vanes (not shown) in the turbine section 16.

Figure 2A:
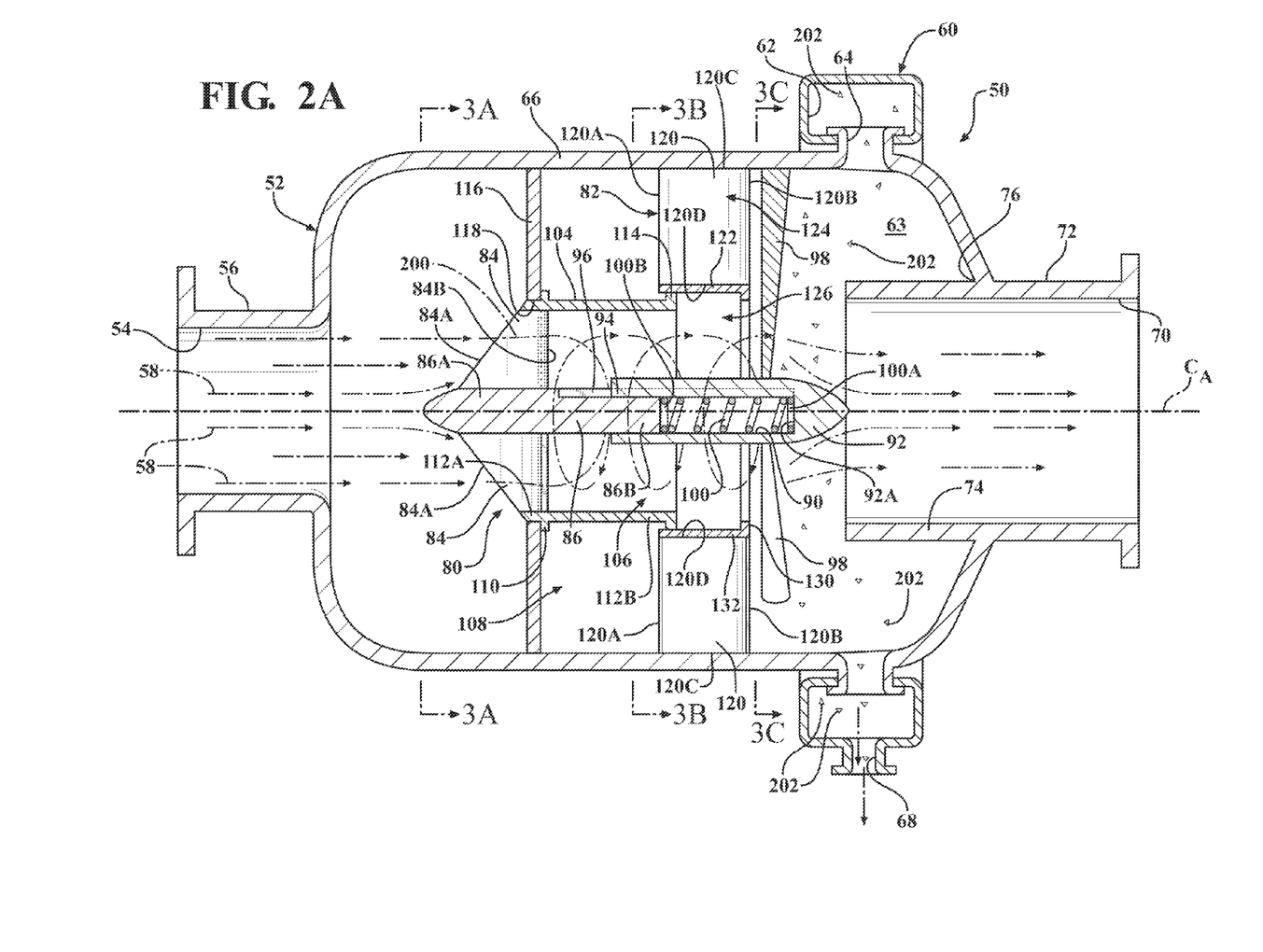
FIG. 2A is a side cross sectional view of the particle separating structure schematically illustrated in FIG. 1, wherein a first swirling structure of the particle separating structure is illustrated in a first position.
Figure 2B:
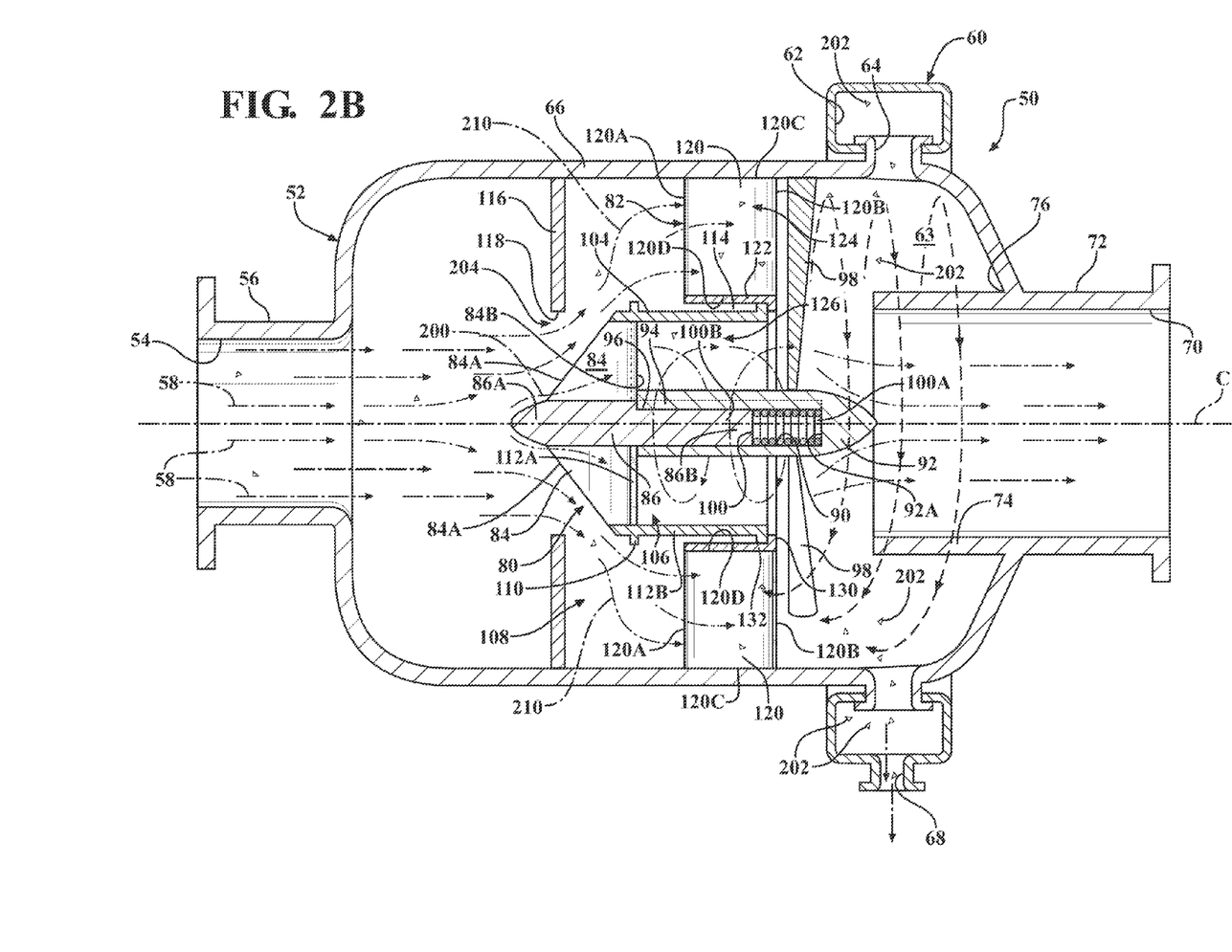
FIG. 2B is a side cross sectional view of the particle separating structure illustrated in FIG. 2A, wherein the first swirling structure is illustrated in a second position.
Figure 2C:
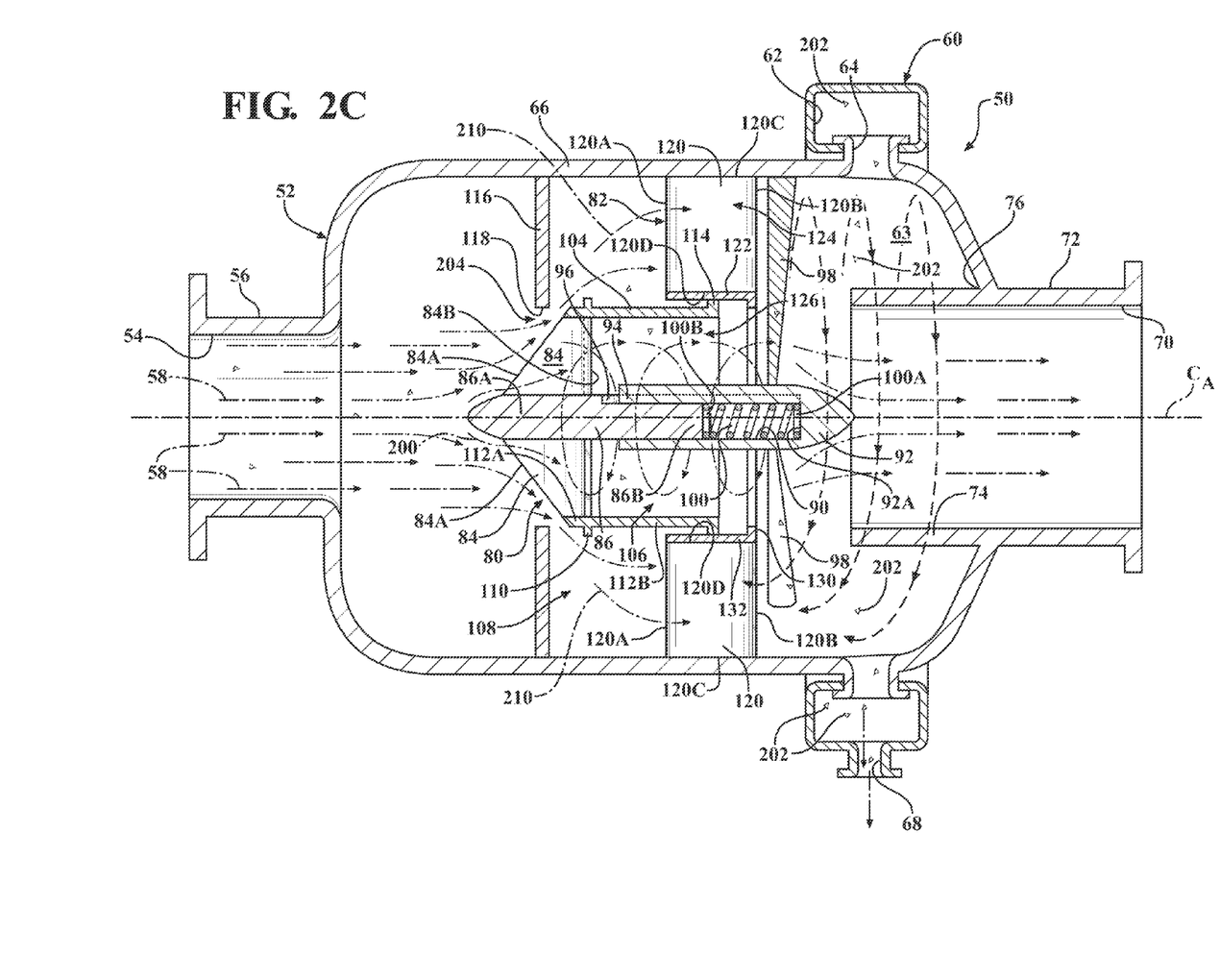
FIG. 2C is a side cross sectional view of the particle separating structure illustrated in FIG. 2A, wherein the first swirling structure is illustrated in an intermediate position between the first and second positions.

Referring now to FIGS. 2A-2C, the particle separating structure 50 is shown during various operating states thereof. The particle separating structure 50 comprises a main housing 52 having an inlet 54 at a first end portion 56 thereof. The inlet 54 receives the cooled, compressed air from the external cooler 20, which air enters the main housing 52 through the inlet 54 in a generally axial direction with reference to a central axis $C_A$ of the particle separating structure 50, as indicated by the arrows 58 in FIGS. 2A-2C.

The main housing 52 also comprises a particle discharge zone 60, which, in the embodiment shown, comprises a continuous ring-shaped particle discharge chamber 62 defined by an outer extension of the main housing 52. The particle discharge chamber 62 is in communication with a main swirling chamber 63 of the particle separating structure 50 via an annular particle exit opening 64 formed in a radially outer wall 66 of the main housing 52. Is noted that directional terms such as "radial", "axial", "circumferential", etc. as used herein with respect to the components of particle separating structure 50 are used with reference to a cylindrical coordinate system defined about the central axis $C_A$ of the particle separating structure 50.

The particle discharge chamber 62 includes a particle outlet 68 or drain at a bottom portion thereof to allow particles separated from the air passing through the particle separating structure 50 to drain out of the particle separating structure 50, as will be discussed herein. It is noted that other types of particle discharge zones 60 than the one illustrated in FIGS. 2A-2C could be used, such as, for example, one or more openings or particle outlets located at the bottom of the main housing outer wall 66, or a chamber in a radially outer portion of the particle separating structure 50, which chamber could be cleaned out as necessary. Further, rather than being an annular opening, the particle exit opening 64 could comprise a plurality of openings located at spaced apart circumferential locations of the outer wall 66.

The particle separating structure 50 further includes a cooling fluid outlet 70 at a second end portion 72 thereof opposite to the first end portion 56. The cooling fluid outlet 70 allows cooling air to exit the particle separating structure 50 so as to flow back into the turbine engine 10. As illustrated in FIGS. 2A-2C, the cooling fluid outlet 70 is located radially inwardly from the particle discharge zone 60. This is preferable, as the particles separated from the cooling air in the particle separating structure 50 tend to flow to the radially outer portion of the main swirling chamber 63, such that the cooling air can pass out of the particle separating structure 50 toward the central axis $C_A$ thereof substantially without any particles. Further, the structure defining the cooling fluid outlet 70, which, in the embodiment shown comprises a cylindrical wall portion 74, preferably extends into the main swirling chamber 63 toward the inlet 54. Such a configuration is believed to reduce the number of particles that flow out of the particle separating structure 50 through the cooling fluid outlet 70 along with the cooling air. Specifically, any particles that do not pass into the particle discharge zone 60 but rather remain in the particle separating structure 50 would likely move toward the junction 76 between the main housing outer wall 66 and the cylindrical wall portion 74 and not into and through the cooling fluid outlet 70.

As shown in FIGS. 2A-2C, the particle separating structure 50 comprises first and second swirling structures 80, 82. The first swirling structure 80 is positionable in at least two different positions, and preferably is positionable in a plurality of different positions, to accommodate differing amounts of air flow through the particle separating structure 50, as will be discussed herein.

Figure 3A:
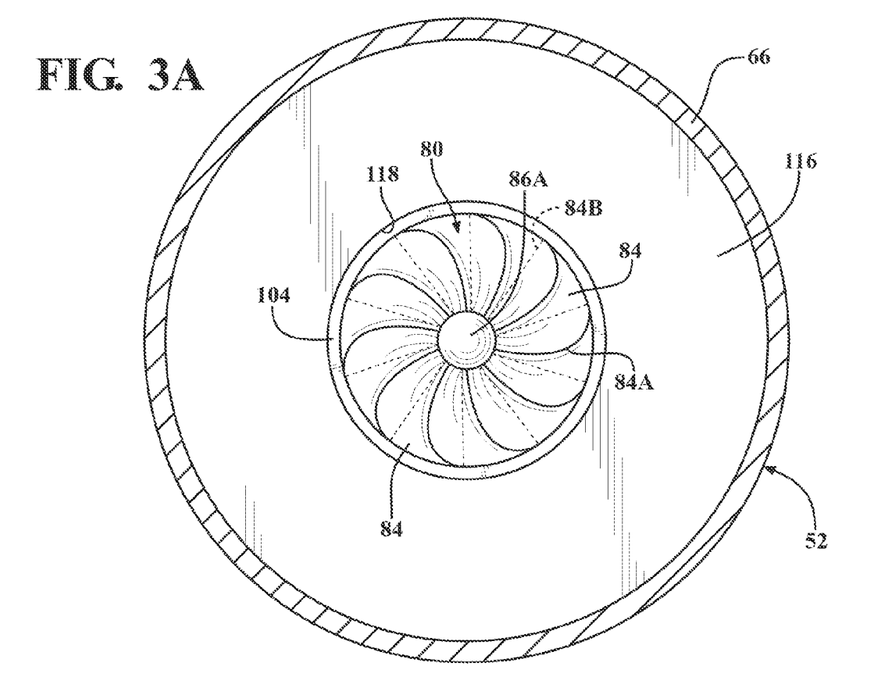
FIG. 3A is a cross sectional view taken along line 3A-3A in FIG. 2A.
Figure 4A:
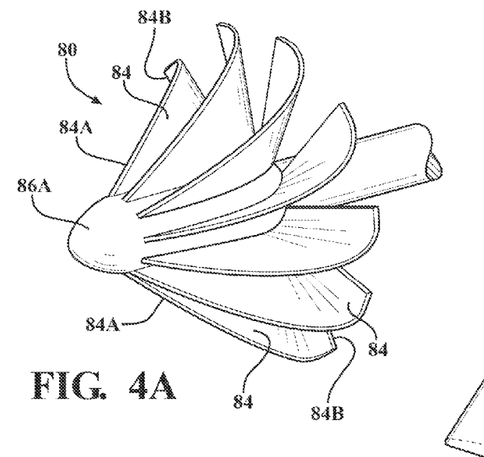
FIGS. 4A and 4B are views looking in a radially inward direction of respective swirl members of first and second swirling structures of the particle separating structure illustrated in FIG. 2A.

The first swirling structure 80 comprises a plurality of swirl members 84, see also FIGS. 3A and 4A. The swirl members 84 each include a forward or leading edge 84A and an aft or trailing edge 84B that is offset from the leading edge 84A in the circumferential direction, see FIGS. 3A and 4A. Details in connection with the flow of cooling air through the swirl members 84 will be discussed below.

Figure 3B:
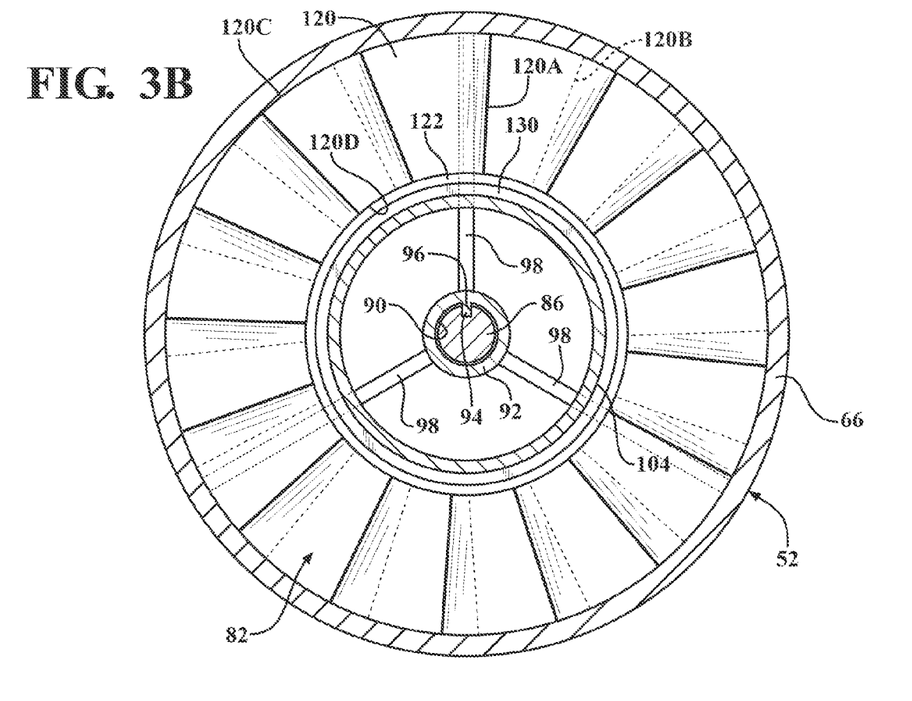
FIG. 3B is a cross sectional view taken along line 3B-3B in FIG. 2A.
Figure 3C:
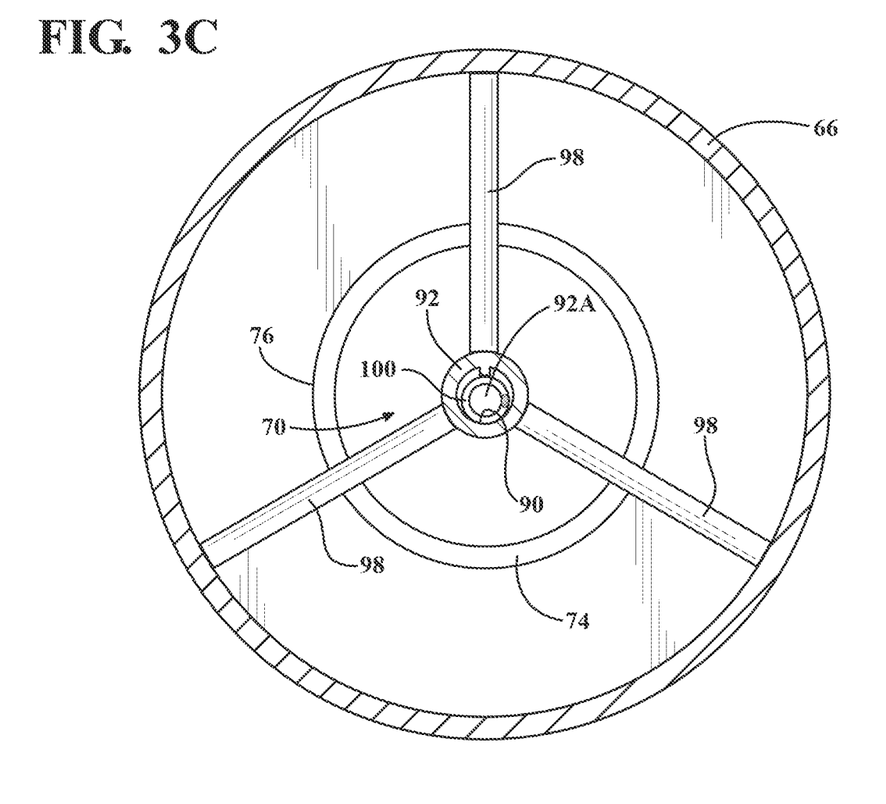
FIG. 3C is a cross sectional view taken along line 3C-3C in FIG. 2A.

The swirl members 84 extend in an annular array from a forward portion 86A of a rigid central member 86 of the first swirling structure 80, see FIGS. 2A-2C, 3A, and 4A. As shown in FIGS. 2A-2C, the central member 86 further includes an aft portion 86B. The aft portion 86B is received in and slides axially within a chamber 90 of a guide member 92 so as to effect the different positions of the first swirling structure 80, as will be discussed herein. The guide member 92 includes an anti-rotation tab 94 (see also FIG. 3B) that extends radially inwardly into the chamber 90 and is received by a corresponding notch or groove 96 formed in the central member 86 to prevent the central member 86 and the remainder of the first swirling structure 80 from rotating in the circumferential direction. The guide member 92 is structurally secured to the outer wall 66 of the main housing 52 via a plurality of, e.g., preferably three or more, struts 98, see FIGS. 2A-2C, 3B, and 3C. The guide member 92 structurally supports the first swirling structure 80 in the particle separating structure 50, i.e., via the struts 98, while allowing the central member 86 of the first swirling structure 80 to slide axially back and forth within the chamber 90.

Referring to FIGS. 2A-2C, a biasing member 100, such as, for example, a coil spring, is located in the chamber 90 of the guide member 92 and provides a bias against the central member 86 in a direction toward the inlet 54 of the particle separating structure 50. More specifically, a first end 100A of the biasing member 100 is situated against an inner wall 92A (see also FIG. 3C) of the guide member 92, which inner wall 92A defines an axial end of the chamber 90, and a second end 100B of the biasing member 100 abuts against and provides a bias to the aft portion 86B of the central member 86. Additional details in connection with the bias provided by the biasing member 100 on the central member 86 will be discussed below.

As shown in FIGS. 2A-2C, radially outer portions of the swirl members 84 are coupled to a hollow first cylindrical member 104 of the first swirling structure 80. The first cylindrical member 104 extends from the swirl members 84 in the axial direction toward the cooling fluid outlet 70 and prevents fluid communication between an area 106 inside of the member 104 and an area 108 outside of the member 104. Hence, cooling air passing between the swirl members 84 of the first swirling structure 80 and into the area 106 inside of the member 104 is prevented from passing into the area 108 outside of the member 104. Further, cooling air bypassing the swirl members 84 of the first swirling structure 80 (to be discussed below) and flowing into the area 108 outside of the member 104 is prevented from passing into the area 106 inside of the member 104.

The first cylindrical member 104 includes first tab structure 110 that extends radially outwardly from a forward end portion 112A of the member 104. The first cylindrical member 104 further includes second tab structure 114 that extends radially outwardly from an aft end portion 112B of the member 104. The first and second tab structures 110, 114 may each comprise a continuous annular element, or may comprise a plurality of, e.g., preferably three or more, individual elements.

A first stop structure 116 of the main housing 52 is illustrated in FIGS. 2A-2C and 3A. The first stop structure 116 extends radially inwardly from the outer wall 66 of the main housing 52 and defines a central aperture 118 that receives the first swirling structure 80, i.e., the forward end portion 112A of the first cylindrical member 104, the swirl members 84, and the forward portion 86A of the central member 86, therein. The first stop structure 116 comprises a continuous, ring-shaped wall member and prevents cooling air from bypassing the swirl members 84 of the first swirling structure 80 when the first swirling structure 80 is positioned in a first position, illustrated in FIG. 2A. That is, while the swirling structure 80 is positioned in its first position, all cooling air passing through the particle separating structure 50 must pass between adjacent swirl members 84 of the first swirling structure 80. However, when the swirling structure 80 is positioned in other positions, such as the second position illustrated in FIG. 2B or an intermediate position such as the one illustrated in FIG. 2C, some cooling air is permitted to bypass the swirl members 84 of the first swirling structure 80, as will be discussed herein. The first stop structure 116 is engaged by the first tab structure 110 of the first cylindrical member 104 when the first swirling structure 80 is positioned in its first position (FIG. 2A) to prevent the first swirling structure 80 from moving axially past a desired foremost position, i.e., to prevent the central member 86 from completely exiting the chamber 90 of the guide member 92.

Figure 4B:
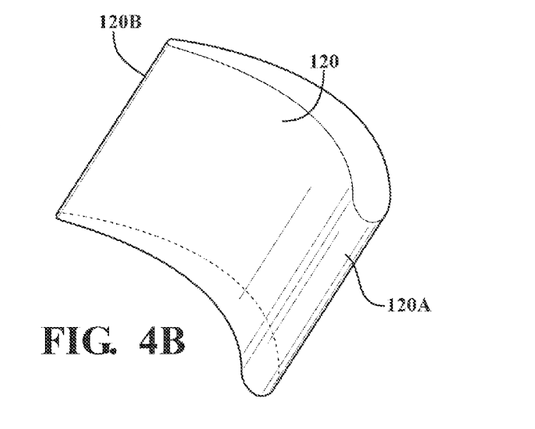

As shown in FIGS. 2A-2C, the second swirling structure 82 is located radially outwardly from and downstream from the first swirling structure 80 (with reference to a flow of cooling air through the particle separating structure 50). The second swirling structure 82 comprises a plurality of swirl members 120, see also FIG. 3B, and see FIG. 4B for an illustration of a single swirl member 120. The swirl members 120 each include a forward or leading edge 120A and an aft or trailing edge 120B that is offset from the leading edge 120A in the circumferential direction, see FIG. 3B. Details in connection with the flow of cooling air through the swirl members 120 will be discussed below.

Radially outer edges 120C of the swirl members 120 of the second swirling structure 82 are affixed to the outer wall 66 of the main casing 52 such that the swirl members 120 extend radially inwardly from the outer wall 66, as shown in FIGS. 2A-2C and 3B. Radially inner edges 120D of the swirl members 120 are coupled to a second hollow second cylindrical member 122.

The second cylindrical member 122 extends in the axial direction from generally the leading edges 120A of the swirl members 120 to generally the trailing edges 120B of the swirl members 120 and prevents fluid communication between an area 124 outside of the member 122 and an area 126 inside of the member 104. Hence, cooling air passing between the swirl members 120 of the second swirling structure 82 and through the area 124 outside of the member 122 is prevented from passing into the area 126 inside of the member 122. Further, cooling air that passes between the swirl members 84 of the first swirling structure 80 and flows into the area 126 inside of the member 122 is prevented from passing into the area 124 outside of the member 122.

The second cylindrical member 122 includes a second stop structure 130 that extends radially inwardly from an aft end portion 132 of the member 122. The second stop structure 130 preferably comprises a continuous annular element, but may comprise a plurality of individual elements. The second stop structure 130 is adapted to engage the second tab structure 114 of the first cylindrical member 104 when the first swirling structure 80 is positioned in its second position (FIG. 2B) to prevent the first swirling structure 80 from moving axially past a desired aftmost position, i.e., to prevent the central member 86 from compressing the biasing member 100 past a desired compression limit.

It is noted that the second cylindrical member 122 could be removed from the radially inner edges 120D of the swirl member 120 and eliminated from the particle separating structure 50. In such a configuration, the radially inner edges 120D of the swirl members 120 could include protuberances (not shown) that function as the second stop structure 130, i.e., the protuberances could extend radially inwardly from the inner edges 120D of the swirl members 120 for engaging the second tab structure 114 of the first cylindrical member 104 when the first swirling structure 80 is positioned in its second position (FIG. 2B). In this regard, the first cylindrical member 104 could prevent fluid communication between the location adjacent the inner edges 120D of the swirl members 120, i.e., corresponding to the area 124, and the area 126 while the first swirling structure 80 is positioned in its second position. While the first swirling structure 80 is positioned in its first position, the prevention of fluid communication between the area 124 and the area 126 is not necessary, as all the cooling air passing through the particle separating structure 50 would pass between adjacent swirl members 84 of the first swirling structure 80, i.e., all the air flowing through the particle separating structure 50 would be swirled by the first swirling structure 80.

Operation of the particle separating structure 50 with the gas turbine engine 10 described above will now be discussed. It is noted that the particle separating structure 50 could be used with other types of engines that utilize cooling fluid for cooling components of the engine. Further, while the particle separating structure 50 is described herein as separating particles from cooling air that is extracted from the compressor section 12 of the engine 10, the particle separating structure 50 could be used to remove particles from other types of cooling fluids or cooling fluids obtained from other locations without departing from the spirit and scope of the invention.

Cooling air flows into the particle separating structure 50 through the inlet 54 thereof, as depicted by the arrows 58 in FIGS. 2A-2C. Particles, e.g., solid or liquid particles, may be carried into the particle separating structure 50 along with the cooling air. The cooling air entering the particle separating structure 50 has a pressure, which is dependent on the amount of overall air mass flow in the engine 10. Higher air mass flows in the engine 10 generally result in more pressure and air mass flow into the external cooler 20 and then into the particle separating structure 50. The air mass flows are generally governed by rotational speed of the engine 10 during engine at start-up, and by the position of the inlet guide vanes 18 once full rotational speed of the engine 10 is achieved. Hence, for the purposes of this discussion, the pressure of the cooling air is generally proportional to the amount of cooling air entering the particle separating structure 50.

Illustrated in FIG. 2A, during a first operating state of the particle separating structure 50, a first amount of cooling air, i.e., a first volumetric flow of cooling air, enters the particle separating structure 50. The pressure of the first amount of cooling air, i.e., a differential pressure between the upstream and downstream ends of the first swirling structure 80, causes the cooling air to exert a force on the first swirling structure 80 in the axial direction toward the cooling fluid outlet 70 of the particle separating structure 50. However, the first amount of cooling air does not exert enough force on the first swirling structure 80 to overcome the bias provided by the biasing member 100 on the central member 86. Hence, the first swirling structure 80 is not caused to move in the axial direction when the first amount of cooling air is entering the particle separating structure 50 during the first operating state, such that the first swirling structure 80 is maintained in its foremost position, as illustrated in FIG. 2A.

During the first operating state, since the first swirling structure 80 is maintained in its foremost position, all of the cooling air must pass through a first cooling fluid flowpath 200 (FIG. 2A) defined between first cylindrical member 104 and the central member 86, such that all of the cooling air must pass between the swirl members 84 of the first swirling structure 80. While passing between the swirl members 84 of the first swirling structure 80, the flow direction of the cooling air is changed by the swirl members 84, such that the cooling air flows circumferentially and axially through the particle separating structure 50 toward the cooling fluid outlet 70.

As the cooling air flows circumferentially through the particle separating structure 50, particles in the cooling air move radially outwardly, i.e., due to their mass and the centrifugal force caused by the circumferential flow, and pass to the radially outer portion of the main swirling chamber 63. These particles, designated by reference number 202 in FIGS. 2A-2C, pass into the particle discharge chamber 62 of the particle discharge zone 60 and are drained out of the particle separating structure 50 through the particle outlet 68. Hence, the first swirling structure 80 operates as a highly efficient swirler at low volumetric flows for separating particles from the flow. The cooling fluid, which is now substantially particle-free, passes out of the particle separating structure 50 through the cooling fluid outlet 72 and is re-introduced into the engine 10, see FIG. 1. It is noted that a pressure differential between the particle separating structure 50 and the portion of the engine 10 to which the cooling air is re-introduced, e.g., the turbine section 16 in the embodiment shown in FIG. 1, causes the cooling air to flow from the particle separating structure 50 back into the engine 10.

Turning now to FIG. 2B, during a second operating state of the particle separating structure 50, a second amount of cooling air, i.e., a second volumetric flow of cooling air, greater than the first amount enters the particle separating structure 50. The pressure of the second amount of cooling air causes the cooling air to exert a force on the first swirling structure 80 in the axial direction toward the cooling fluid outlet 70 of the particle separating structure 50. The second amount of cooling air exerts enough force on the first swirling structure 80 to overcome the bias provided by the biasing member 100 on the central member 86 and to move the first swirling structure 80 all the way to its aftmost position (FIG. 2B).

During the second operating state, a first portion of the cooling air passes through the first cooling fluid flowpath 200, see FIG. 2B, wherein the swirl members 84 of the first swirling structure 80 change the flow direction of the first portion of cooling air as discussed above. However, since the first swirling structure 80 is positioned in its aftmost position during the second operating state, a second portion of cooling fluid is permitted to flow through a gap 204 between the first cylindrical member 104 and the first stop structure 116, such that the second portion of cooling air is able to bypass at least a section of the first cooling fluid flowpath 200, i.e., the second portion of cooling air bypasses the swirl members 84 of the first swirling structure 80. The second portion of cooling air passes through the gap 204 and then through a second cooling fluid flowpath 210, see FIG. 2B, where the second portion of cooling air passes between adjacent swirl members 120 of the second swirling structure 82. While passing between the swirl members 120 of the second swirling structure 82, the flow direction of the cooling air is changed by the swirl members 120, such that the cooling air flows circumferentially and axially through the particle separating structure 50 toward the cooling fluid outlet 70. It is noted that, in a preferred embodiment, the swirl members 84, 120 of the first and second swirling structures 80, 82 cause the respective first and second portions of cooling air to flow circumferentially in the same direction, i.e., in a clockwise direction as illustrated in FIG. 2B.

As the first and second portions of the cooling air flow circumferentially and axially through the particle separating structure 50, particles 202 in the cooling air move radially outwardly as described above and are drained out of the particle separating structure 50 through the particle outlet 68. As discussed above, the substantially particle-free cooling fluid passes out of the particle separating structure 50 through the cooling fluid outlet 72 and is re-introduced into the engine 10.

Referring to FIG. 2C, the first swirling structure 80 according to the preferred embodiment is also positionable in at least one intermediate position between the first position (FIG. 2A) and the second position (FIG. 2B). To position the first swirling structure 80 in an intermediate position, an amount of air flow, i.e., a volumetric flow of cooling air, enters the particle separating structure 50 greater than the first amount but less than the second amount such that the pressure thereof causes the cooling air to exert enough force on the first swirling structure 80 to overcome the bias of the biasing member 100, but not enough force to move the first swirling structure all the way to its aftmost position. While in an intermediate position, cooling air is permitted to flow through both the first and second cooling fluid flowpaths 202, 210, though a lesser amount of cooling fluid is able to flow through the gap 204 and bypass the first cooling fluid flowpath 200 as compared to when the first swirling structure 80 is positioned in its aftmost position during the second operating state.

With the movement of the first swirling structure 80 between its foremost and aftmost positions illustrated in FIGS. 2A and 2B, respectively, based on the amount of cooling fluid entering the main housing 52 through the inlet 54, the particle separating structure 50 is able to effectively increase the cross-sectional area of the flow path in order to accommodate different flow rates therethrough without requiring the use of a separate particle separating unit. Further, in a preferred embodiment, the biasing member 100 can be configured such that the bias thereof against the central member 86 is overcome by a predefined and desired amount of air flow into the particle separating structure 50. Moreover, the flow of the air through the particle separating structure 50 is believed to be accommodated without a substantial pressure restriction on the air.

Additionally, since the majority of the particles 202 in the cooling air to be re-introduced into the engine 10 are removed by the particle separating structure 50, the cooling provided by the cooling air is believed to be improved, as particles can clog or otherwise block cooling passages and/or cooling holes that deliver the cooling fluid to the structure to be cooled.

It is noted that the operating states of the particle separating structure 50 discussed above are based on the amount of cooling air that is entering the particle separating structure 50 at a particular time. However, according to another embodiment of the invention, the position of the central member 86 could be controlled so as to allow a desired amount of cooling fluid flow through the particle separating structure 50. For example, the central member 86 could be electrically/mechanically controlled so as to move the first swirling structure 80 to its foremost position, its aftmost position, or an intermediate position based on a desired amount of cooling fluid to be output from the particle separating structure 50. Such a controlled central member 86 could also be used in combination with the biasing member 100 to urge the central member toward its foremost position.

Further, according to yet another embodiment of the invention, the particle separating structure 50 could be operated as a cooling fluid distribution structure without the swirl members 84, 120. For example, the first and second swirling structures 80, 82 discussed above could be replaced with cooling fluid structures, such as spaced apart members that are designed to permit a predetermined amount of fluid flow therethrough, wherein these members would not necessarily have to perform a swirling function. Such a configuration may be useful where it is desirable to be able to adjust the amount of cooling fluid that is introduced, or re-introduced if the cooling fluid was cooling air that was extracted from a compressor section of an engine, into an engine.

Further, while the particle separating structure 50 in the above-embodiments is illustrated and discussed as being located outside of the engine 10, the particle separating structure 50 could be arranged in a suitable location within the engine 10 without departing from the spirit and scope of the invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A particle separating structure for use with a turbine engine comprising:
    a main housing including an inlet, a cooling fluid outlet, and a particle discharge zone;
    first swirling structure for swirling cooling fluid passing through a first cooling fluid flowpath defined in said main housing;
    second swirling structure for swirling cooling fluid passing through a second cooling fluid flowpath defined in said main housing;
    wherein:
        said first swirling structure is positionable in at least two positions, a first position allowing cooling fluid to pass through said first cooling fluid flowpath and a second position allowing cooling fluid to pass through said first and second cooling fluid flowpaths; and
        the swirling of the cooling fluid effected by said first and second swirling structures causes particles in the cooling fluid to pass to said particle discharge zone while the cooling fluid passes out of said main housing through said cooling fluid outlet.

2. The particle separating structure according to claim 1, wherein said particle discharge zone comprises an annular particle collection chamber.

3. The particle separating structure according to claim 2, wherein said particle discharge zone further comprises a particle outlet located in a bottom portion of said particle collection chamber.

4. The particle separating structure according to claim 1, wherein said cooling fluid outlet is located radially inwardly from said particle discharge zone.

5. The particle separating structure according to claim 1, wherein said first swirling structure moves axially between said first and second positions based on an amount of cooling fluid entering said main housing inlet.

6. The particle separating structure according to claim 5, wherein:
    said first swirling structure is positioned in its first position when a first amount of cooling fluid enters said main housing inlet; and
    said first swirling structure is caused to be positioned in its second position when a second amount of cooling fluid greater than the first amount enters said main housing inlet.

7. The particle separating structure according to claim 6, wherein said main housing further comprises a first stop structure, said first stop structure is engaged by said first swirling structure when in its first position to prevent said first swirling structure from moving axially past a desired foremost position.

8. The particle separating structure according to claim 7, further comprising a second stop structure, said second stop structure is engaged by said first swirling structure when in its second position to prevent said first swirling structure from moving axially past a desired aftmost position.

9. The particle separating structure according to claim 7, further comprising a biasing member for biasing said first swirling structure axially toward said first stop structure.

10. The particle separating structure according to claim 1, wherein said first swirling structure is positionable in at least one position between said first and second positions.

11. The particle separating structure according to claim 10, wherein:
   said first swirling structure is positioned in its first position when a first amount of cooling fluid enters said main housing inlet;
   said first swirling structure is caused to be positioned in its second position when a second amount of cooling fluid greater than the first amount enters said main housing inlet; and
   said first swirling structure is caused to be positioned in a position between said first and second positions when an amount of cooling fluid entering said main housing inlet is greater than the first amount but less than the second amount.

12. The particle separating structure according to claim 1, wherein said first swirling structure comprises a plurality of swirl members, each swirl member comprising a leading edge and a trailing edge offset from said leading edge in a circumferential direction.

13. The particle separating structure according to claim 12, wherein said second swirling structure comprises a plurality of swirl members, each swirl member comprising a leading edge and a trailing edge offset from said leading edge in the circumferential direction.

14. A particle separating structure for use with a turbine engine comprising:
   a main housing comprising:
      an inlet;
      a cooling fluid outlet;
      a particle discharge zone located radially outwardly from said cooling fluid outlet;
      a first stop structure; and
      a biasing member;
   first swirling structure in said main housing for swirling cooling fluid passing through a first cooling fluid flowpath defined in said main housing;
   wherein:
      said first swirling structure is positionable in at least two positions, said positions based on an amount of cooling fluid entering said main housing through said inlet, a first position of said first swirling structure allowing cooling fluid to pass through said first cooling fluid flowpath and a second position of said first swirling structure allowing a first portion of cooling fluid to pass through said first cooling fluid flowpath and a second portion of cooling fluid to bypass at least a section of said first cooling fluid flowpath;
      said biasing member biases said first swirling structure toward said first stop structure such that said first swirling structure engages said first stop structure when in its first position; and
      the swirling of the cooling fluid effected by said first swirling structure causes particles in the cooling fluid to pass to said particle discharge zone while the cooling fluid passes out of said main housing through said cooling fluid outlet.

15. The particle separating structure according to claim 14, further comprising second swirling structure in said main housing for swirling the second portion of cooling fluid.

* * * * *